United States Patent
Gordon, III et al.

(10) Patent No.: US 12,462,321 B1
(45) Date of Patent: Nov. 4, 2025

(54) ANTI-LEAK DIGITAL DOCUMENT MARKING SYSTEM AND METHOD USING DISTRIBUTED LEDGER

(71) Applicant: Equity Shift, Inc., Raleigh, NC (US)

(72) Inventors: Thomas Marshall Gordon, III, Raleigh, NC (US); Gregory Frederick Bush, Cary, NC (US)

(73) Assignee: Equity Shift, Inc., Raleigh, NC (US)

( * ) Notice: Subject to any disclaimer, the term of this patent is extended or adjusted under 35 U.S.C. 154(b) by 0 days.

(21) Appl. No.: 19/205,261

(22) Filed: May 12, 2025

Related U.S. Application Data

(63) Continuation of application No. 18/982,610, filed on Dec. 16, 2024, now Pat. No. 12,307,546, which is a continuation of application No. 18/883,474, filed on Sep. 12, 2024, now Pat. No. 12,205,189, which is a continuation of application No. 18/615,571, filed on Mar. 25, 2024, now Pat. No. 12,118,638, which is a continuation of application No. 18/495,340, filed on Oct. 26, 2023, now Pat. No. 11,954,756, which is a continuation of application No. 18/134,330, filed on Apr. 13, 2023, now Pat. No. 11,816,756.

(51) Int. Cl.
| | | |
|---|---|---|
| *G06T 1/00* | (2006.01) | |
| *G06F 16/901* | (2019.01) | |
| *G06F 16/93* | (2019.01) | |
| *H04L 9/00* | (2022.01) | |

(52) U.S. Cl.
CPC ........ *G06T 1/0021* (2013.01); *G06F 16/9014* (2019.01); *G06F 16/93* (2019.01); *H04L 9/50* (2022.05); *G06T 2201/0062* (2013.01)

(58) Field of Classification Search
CPC .......... G06T 1/0021; G06T 2201/0062; G06F 16/9014; G06F 16/93; G06F 16/61–634; H04L 9/50
See application file for complete search history.

(56) References Cited

U.S. PATENT DOCUMENTS

| | | | |
|---|---|---|---|
| 7,644,281 B2 | 1/2010 | Deguillaume et al. | |
| 8,886,944 B2 | 11/2014 | Mastrangelo et al. | |
| 10,949,509 B2 | 3/2021 | Freire et al. | |
| 10,997,482 B2 | 5/2021 | Webster | |
| 11,062,106 B2 | 7/2021 | Ebrahimi et al. | |
| 2019/0340341 A1 | 11/2019 | Fleck et al. | |
| 2019/0372769 A1 | 12/2019 | Fisher et al. | |
| 2020/0162266 A1* | 5/2020 | Miller | H04L 9/3239 |
| 2021/0027033 A1 | 1/2021 | Howard et al. | |

\* cited by examiner

*Primary Examiner* — Christopher Wait
(74) *Attorney, Agent, or Firm* — NEO IP

(57) ABSTRACT

The system is disclosed for visual marking sensitive documents for leak prevention. Each time an action is taken with regard to a document (e.g., creation, viewing, downloading), that action is added to a distributed ledger, essentially creating a unique hash for a new instance of the document. This new hash is visually embedded in the document as a code comprising a plurality of differently shaded pixels, wherein some of the pixels directly encode information regarding the document (e.g., an account that generated the new instance of the document, a date, a time, a unique ID for the document, etc.) and some of the pixels do not encode information. The code is capable of being scanned either digitally or physically on a printed version of the document, such that the immediate source of the document, corresponding to who leaked the document, is able to be discerned.

20 Claims, 5 Drawing Sheets

ANTI-LEAK DIGITAL DOCUMENT MARKING SYSTEM AND METHOD USING DISTRIBUTED LEDGER

CROSS-REFERENCES TO RELATED APPLICATIONS

The present invention is related to and claims priority from the following U.S. patent documents: this application is a continuation of U.S. patent application Ser. No. 18/982, 610, filed Dec. 16, 2024, which is a continuation of U.S. patent application Ser. No. 18/883,474, filed Sep. 12, 2024, which is a continuation of U.S. patent application Ser. No. 18/615,571, filed Mar. 25, 2024 and issued as U.S. Pat. No. 12,118,638, which is a continuation of U.S. patent application Ser. No. 18/495,340, filed Oct. 26, 2023 and issued as U.S. Pat. No. 11,954,756, which is a continuation of U.S. patent application Ser. No. 18/134,330, filed Apr. 13, 2023 and issued as U.S. Pat. No. 11,816,756, which is incorporated herein by reference in its entirety.

BACKGROUND OF THE INVENTION

1. Field of the Invention

The present invention relates to system and methods for marking digital documents, and more specifically to markings encoding unique blockchain addresses for anti-leak protection.

2. Description of the Prior Art

Digitally watermarking various types of media is known in the art. Digital watermarks are ways to mark media such that the source of the media is able to be detected, either visually or through the use of algorithmic analysis of the media. Common reasons for watermarking media is to protect copyrights and authentic media. Digital watermarks have been developed such that they are still able to be detected even if the media is modified in some way, such as through compression, color correction, rotation, cropping, or otherwise modified. Digital watermarks are able to take the form of visible words or symbols, commonly transparent or translucent, overlaying the media, or invisible signals subtly embedded in the code of the media.

The field of digital watermarking considers three stages in the life cycle of item of media: embedding, distortion, and detection. The embedding phase is when the watermark is placed on the media, the distortion phase is when noise is introduced to the media or when a party attempts to manipulate the media is change the watermarked data, and the detection phase is when keys are used to verify the presence of the watermark on the media.

Various techniques exist for digital watermarking. One form, commonly known as "spatial domain" watermarking changes values for different pixels of the media, thereby visibly modifying the document. Examples of spatial domain watermarking include least significant bit (LSB), wherein the watermarks are added specifically to the least significant bit of each pixel so as to prevent large changes to the image, and spread-spectrum modulation (SSM) which combines the main image with a small noise signal modulated by the watermark, so as to essentially disperse the watermark throughout the image, with low visibility. In addition to spatial domain watermarks, frequency domain watermarks are also often used, and attempt to embed the watermarks in spectral coefficients of the image. With frequency domain watermarks, the image is first converted from the spatial domain to the frequency domain using a technique such as a Discrete Cosine Transform (DCT), Discrete Wavelet Transform (DWT), or Discrete Fourier Transform (DFT), after which magnitude or phase coefficients of the frequency-domain image are modified to add the watermark.

Prior art patent documents include the following:

U.S. Pat. No. 10,997,482 for Two-dimensional cryptographic poly-chromatic poly-digital code by inventor Webster, filed Aug. 7, 2020 and issued May 4, 2021, discloses a system and method employing two-dimensional, cryptographic, poly-chromatic, poly-digital codes ("polycodes") that may be employed in connection with various digital transactions and communications applications. In some implementations, a polycode may generally comprise a plurality of discrete code cells arranged in a two-dimensional matrix, each of the plurality of code cells displaying a combination of zero or more pure chromatic inputs representing an encoded integer; the number of possible combinations of pure chromatic inputs is equal to the number of possible integer values such that a discrete combination of pure chromatic inputs is unique to a discrete integer that is used in the polycode.

US Patent Publication No. 2021/0027033 for Identifier allocation for optical element sets in machine-read articles by inventors Howard et al., filed Mar. 27, 2019 and published Jan. 28, 2021, discloses a method including selecting, by a coding computing device, a particular identifier from a set of identifiers generated by an identifier allocation authority, wherein the set of identifiers are included within a global set of identifiers maintained by the identifier allocation authority; coding, by the coding computing device, the particular identifier from the set of identifiers into an optical element set that represents an optical code comprising a plurality of finder optical elements arranged in a pattern to localize the optical code within an image, a plurality of context optical elements representing context information, and a plurality of content optical elements representing content information; and generating a visual output of the optical code that is decodable to the particular identifier which, in combination with at least one other parameter associated with the optical element set, comprises a globally unique identifier in a set of globally unique identifiers.

US Patent Publication No. 2019/0372769 for Blockchain-universal document identification by inventors Fisher et al., filed Jun. 3, 2019 and published Dec. 5, 2019, discloses a visual code to embed a universal identifier directly into document content. The universal identifier may include a reference to a respective location within a distributed ledger and can be used to retrieve information related to the document including version information, author information, audit information, and signature information.

U.S. Pat. No. 8,886,944 for Watermark to identify leak source by inventors Mastrangelo et al., filed Jun. 22, 2010 and issued Nov. 11, 2014, discloses watermarks to deter certain types of information leaks. In one example, leaks occur in the form of posting, in public forums, screen shots of private pages. To deter this example kind of leak, private web pages within an organization may be watermarked with an experience identifier that identifies the session in which the screen shot is captured. Other information may also be included in the watermark. The watermark may be designed to survive image compression, so that it can be recovered from either a compressed or uncompressed image of the web page. By using an experience identifier recovered from the watermark, and logs that describe activity associated with that experience identifier, it may be possible to identify the source of the information leak.

U.S. Pat. No. 7,644,281 for Character and vector graphics watermark for structured electronic documents security by inventors Deguillaume et al., filed Sep. 27, 2004 and issued Jan. 5, 2010, discloses a method and apparatus for watermarking text or vector graphics documents. It is based on character-wise or vector graphics element-wise grayscale or color modulation. At high resolution, halftone or dither modulation can also be used in addition or in place of grayscale/color modulation, for printed representation of electronic document. For the detection, the document is acquired through an acquisition device, document segmentation is performed, characters/elements are segmented, the watermark signal is estimated and the information is decoded. Although the proposed scheme mostly addresses the watermarking of hard-copy documents, it can easily be integrated into electronic document editing and acquisition tools, and the watermark is attached to the document electronic version. The invention is applicable either using expensive high-resolution printing and acquisition devices, either using common cheap low-resolution devices, depending on the application needs. The proposed scheme is suitable for example to the protection of security documents, contracts, technical and commercial documentation; it can use any physical support like paper, cellulose, or plastic; it can be used for copy protection, authentication, or tamper proofing; finally it can also be applied to other non security-related applications, such as document tracking, as well as document embedded annotation and watermarked-assisted automatic processing.

U.S. Pat. No. 10,949,509 for Watermark embedding and extracting method for protecting documents by inventors Freire et al., filed Oct. 25, 2018 and issued Mar. 16, 2021, discloses a method for watermarking documents comprising identifying and locating spaces in a received original document by a location analysis module which distinguishes between intra-word spaces and inter-word spaces, minimizing an error probability of interference between intra-word spaces and inter-word spaces in the watermarked document by an optimization module, encoding the message into codewords and encoding the codewords into the watermark, embedding the watermark to generate the watermarked document by modifying the intra-word spaces and inter-word spaces of the original document.

U.S. Pat. No. 11,062,106 for Large data transfer using visual codes with feedback confirmation by inventors Ebrahimi et al., filed Nov. 26, 2019 and issued Jul. 13, 2021, discloses a method of confirming receipt, including iteratively capturing by a receiving device visual codes in a series of visual codes displayed on a sending device. A corresponding captured visual code being from a display block that resulted from a partition of an original data file into display blocks, and wherein each display block is converted to a corresponding string and header including an ordered identifying display block number and a total count of the display blocks. Each corresponding string is converted to a corresponding visual code. Each of the captured visual codes is converted into a corresponding string and a header is read for the corresponding string. Captured display blocks are determined. A confirmation message is generated including information indicating which display blocks have been received. The confirmation message is sent over a wireless communication link to the sending device to reduce the number of visual codes being displayed.

US Patent Publication No. 2019/0340341 for Systems and methods for adding watermarks using an embedded browser by inventors Fleck et al., filed May 3, 2019 and published Nov. 7, 2019, discloses systems and methods for adding watermarks using an embedded browser. To provide protection to sensitive information from a network application rendered via an embedded browser of a client application, the client application can generate an overlay with a digital watermark, and apply the overlay over the embedded browser. The client application can selectively generate such overlays, and can customize the format of the digital watermark according to the information rendered on the embedded browser. The watermark can remain with any information that is imaged from the embedded browser, and provides a deterrent against misuse of the information via image capture from a computer screen for instance. By adjusting properties (e.g., contrast) of such an image, the watermark can be made visible and detectable, thus allowing such imaging activities and information to be tracked.

SUMMARY OF THE INVENTION

The present invention relates to system and methods for marking digital documents, and more specifically to markings encoding unique blockchain addresses for anti-leak protection.

It is an object of this invention to mark sensitive documents such that the identity of individuals who leak the documents are able to be discerned.

In one embodiment, the present invention is directed to a system for digitally encoding a digital document, including a server, including a processor and a memory, in network communication with at least one user device, wherein the server is operable to receive a document request message from the at least one user device, wherein the document request message includes a request to view or download one or more digital documents, wherein, upon receiving the document request message, the server automatically updates a distributed ledger and generates a hash value corresponding to a new entry on the distributed ledger, wherein the hash value includes information including an identity of the at least one user device, at least one geolocation, a unique document ID, and/or a unique ID associated with an original creator of the one or more digital documents, wherein the server is operable to generate a visual code corresponding to the hash value, wherein the visual code includes a plurality of polygons, and wherein a pattern of the plurality of polygons and/or a greyscale shading of each of the plurality of polygons uniquely corresponds to the hash value, and wherein the server is operable to alter pixels of the one or more digital documents in order to embed the visual code in the one or more digital documents.

In another embodiment, the present invention is directed to a system of digitally encoding a digital document, including a server, including a processor and a memory, in network communication with at least one user device, wherein the server is operable to receive a document request message from the at least one user device, wherein the document request message includes a request to view or download one or more digital documents, wherein, upon receiving the document request message, the server automatically updates a distributed ledger and generates a hash value corresponding to a new entry on the distributed ledger, wherein the server is operable to scan the one or more digital documents for one or more preselected letters and/or one or more preselected sequences of letters, wherein the server is operable to generate a visual code corresponding to the hash value, wherein the visual code includes a plurality of polygons, and wherein a pattern of the plurality of polygons and/or a greyscale shading of each of the plurality of polygons uniquely corresponds to the hash value, wherein the server is operable to embed the visual code in the one or more preselected letters and/or the one or more preselected sequences of letters, and wherein the server is operable to alter pixels of the one or more digital documents in order to embed the visual code in the one or more digital documents.

In yet another embodiment, the present invention is directed to a method for digitally encoding a digital document, including providing a server, including a processor and a memory, in network communication with at least one user device, the server receiving a document request message from the at least one user device, wherein the document request message includes a request to view or download one or more digital documents, upon receiving the document request message, the server automatically updating a distributed ledger and generating a hash value corresponding to a new entry on the distributed ledger, the hash value including information including an identity of the at least one user device, at least one geolocation, a unique document ID, and/or a unique ID associated with an original creator of the one or more digital documents, the server generating a visual code corresponding to the hash value, wherein the visual code includes a plurality of polygons, and wherein a pattern of the plurality of polygons and/or a greyscale shading of each of the plurality of polygons uniquely corresponds to the hash value, and the server altering the pixels of the one or more digital documents in order to embed the visual code in the one or more digital documents.

These and other aspects of the present invention will become apparent to those skilled in the art after a reading of the following description of the preferred embodiment when considered with the drawings, as they support the claimed invention.

DETAILED DESCRIPTION

Figure 1:
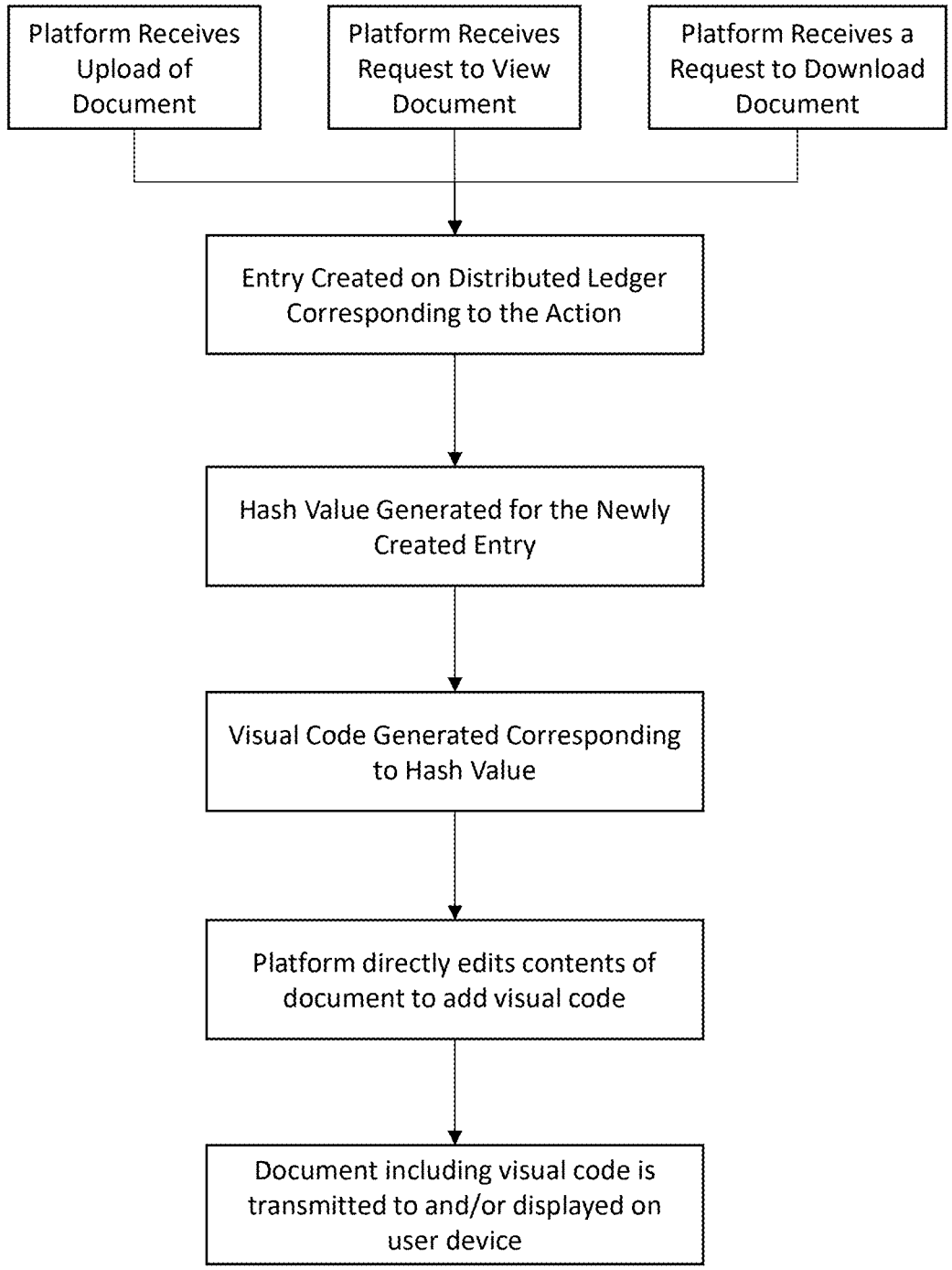
FIG. 1 illustrates a flow diagram for creating a code pattern and applying the code pattern to a digital document according to one embodiment of the present invention.

The present invention relates to system and methods for marking digital documents, and more specifically to markings encoding unique blockchain addresses for anti-leak protection.

In one embodiment, the present invention is directed to a system for digitally encoding a digital document, including a server, including a processor and a memory, in network communication with at least one user device, wherein the server is operable to receive a document request message from the at least one user device, wherein the document request message includes a request to view or download one or more digital documents, wherein, upon receiving the document request message, the server automatically updates a distributed ledger and generates a hash value corresponding to a new entry on the distributed ledger, wherein the hash value includes information including an identity of the at least one user device, at least one geolocation, a unique document ID, and/or a unique ID associated with an original creator of the one or more digital documents, wherein the server is operable to generate a visual code corresponding to the hash value, wherein the visual code includes a plurality of polygons, and wherein a pattern of the plurality of polygons and/or a greyscale shading of each of the plurality of polygons uniquely corresponds to the hash value, and wherein the server is operable to alter pixels of the one or more digital documents in order to embed the visual code in the one or more digital documents.

In another embodiment, the present invention is directed to a system of digitally encoding a digital document, including a server, including a processor and a memory, in network communication with at least one user device, wherein the server is operable to receive a document request message from the at least one user device, wherein the document request message includes a request to view or download one or more digital documents, wherein, upon receiving the document request message, the server automatically updates a distributed ledger and generates a hash value corresponding to a new entry on the distributed ledger, wherein the server is operable to scan the one or more digital documents for one or more preselected letters and/or one or more preselected sequences of letters, wherein the server is operable to generate a visual code corresponding to the hash value, wherein the visual code includes a plurality of polygons, and wherein a pattern of the plurality of polygons and/or a greyscale shading of each of the plurality of polygons uniquely corresponds to the hash value, wherein the server is operable to embed the visual code in the one or more preselected letters and/or the one or more preselected sequences of letters, and wherein the server is operable to alter pixels of the one or more digital documents in order to embed the visual code in the one or more digital documents. Embedding the visual code into the preselected letters is particularly advantageous in both hiding the code and in not calling attention to the fact that a code exists in the first place. However, one of ordinary skill in the art will understand that, in most instances, embedding the code in letters will require more space than merely placing it outside of the text area, as the thickness and shape of the letters provides additional constraints.

In yet another embodiment, the present invention is directed to a method for digitally encoding a digital document, including providing a server, including a processor and a memory, in network communication with at least one user device, the server receiving a document request message from the at least one user device, wherein the document request message includes a request to view or download one or more digital documents, upon receiving the document request message, the server automatically updating a distributed ledger and generating a hash value corresponding to a new entry on the distributed ledger, the hash value including information including an identity of the at least one user device, at least one geolocation, a unique document ID, and/or a unique ID associated with an original creator of the one or more digital documents, the server generating a visual code corresponding to the hash value, wherein the visual code includes a plurality of polygons, and wherein a pattern of the plurality of polygons and/or a greyscale shading of each of the plurality of polygons uniquely corresponds to the hash value, and the server altering the pixels of the one or more digital documents in order to embed the visual code in the one or more digital documents.

Digital watermarks in the past have primarily been used to note if media has been tampered with or to verify the authenticity of media as originating from a specific source. Therefore, a logo, for example, is commonly used as a digital watermark for media to denote that the media originates from the person or company associated with the logo. However, digital watermarks are less commonly used as unique codes corresponding to each document.

One of the few examples of a system using the blockchain to uniquely code each document is found in U.S. Patent Publication No. 2019/0372769, which is incorporated herein by reference in its entirety. However, the '769 publication is intended to serve as a document identifier and has several deficiencies, which prevent it from adequately serving as an anti-leak protector. First, the quick response (QR) code used in the '769 publication is obvious and needs to be obvious in order for it to be effectively used to management documents, as is the intention of the '769 publication. Second, QR codes use a publicly known algorithm to correspond to a value or website address, preventing the QR code from sufficiently limiting public understanding of the code's meaning. Finally, and most importantly, the system in the '769 publication only assigns a single code value to each document, or to each version of a document. It does not generate a unique hash value or unique visual code each time a document is viewed or downloaded. Again, this fits the purpose of the '769 publication, which is meant to manage documents, not manage who has accessed documents. Therefore, a system is needed that provides anti-leak functionality using unique, distributed ledger-based identifiers for digital documents.

Referring now to the drawings in general, the illustrations are for the purpose of describing one or more preferred embodiments of the invention and are not intended to limit the invention thereto.

FIG. 1 illustrates a flow diagram for creating a code pattern and applying the code pattern to a digital document according to one embodiment of the present invention. The present invention includes a platform, including a server and a database, with the server including a processor and a memory. The platform is in network communication (e.g., WI-FI, BLUETOOTH, etc.) with a plurality of user devices (e.g., personal computers, smart phones, tablets, etc.). The platform receives a request to upload a digital document, view a digital document, and/or download a digital document. When the platform receives a request to upload a digital document, a first version of the digital document is saved on the database, and an entry is created in a distributed ledger (e.g., a blockchain, a directed acyclic graph (DAG), etc.) corresponding to the uploaded digital document. In one embodiment, the platform is operable to receive a request to upload an updated version of the digital document. In response, the platform creates a new entry on the distributed ledger connected to the original entry and a second version of the digital document is saved on the database. When the platform receives a request to view or download the digital document, a unique hash value is generated corresponding to the request, wherein the hash value encodes information regarding the user requesting the document, at least one geolocation of the user device requesting the digital document, a date the document was requested, a unique document ID, and/or a unique ID associated with an original uploader (or creator) of the digital document. In one embodiment, the request to view or download the digital document is recorded as an entry on the distributed ledger and the hash value corresponds to a unique hash value for the recorded entry of the request.

The platform generates a visual code corresponding to the hash value. In one embodiment, the visual code is applied to the document by directly editing pixel values of the digital document. The digital document including the visual code is then displayed on a screen of the requesting user device and/or downloaded to a memory of the requesting user device. In one embodiment, no version of the digital document without the visual code is transmitted to any user device. In one embodiment, no version of the digital document with the visual code is saved to the at least one database in communication with the server. Therefore, when a subsequent user device requests to view the document, the server is not required to delete the previous visual code and add a new visual code, but rather only needs to apply the new visual code.

In one embodiment, the visual code is able to be scanned by a scanning device (which includes a processor having a key for translating visual codes to a unique hash value) in order to generate the hash value corresponding to the visual code and/or information contained within the hash value, including the user who requested the document. In one embodiment, the digital document or a printed version of the digital document is magnified at least 400% before being analyzed by the scanning device. This is notable, as the required zoom in order to sufficiently analyze and decode the watermark is beyond the zoom capabilities of many programs, which often only go to about 200% zoom. In one embodiment, the server is operable to receive a selection of one or more specific digital documents and/or versions of specific digital documents from the scanning device or from another user device and the server communicates to the scanning device a list of possible hash values corresponding to the selected digital documents. By working from a limited list of possible hash values, the system is able to determine the source of the leak with greater accuracy, the scanning device is able to provide one or more probable hash values corresponding to the visual code in addition to confidence values in determining that the hash value is a match for the visual code. This is particularly useful in situations where a printing error or rendering error causes the hash value of the visual code to be indistinguishable from those corresponding to one or more similar visual codes. Even if the hash value cannot be distinguished from very similar hash values, there is high likelihood that the hash value will be able to be distinguished from other possible hash values relevant to the specific digital document(s). In this way, the platform allows originators of a leaked document to be tracked and the source of the leak to be discovered.

It will be understood by one of ordinary skill in the art that the present system does not require storage of entire versions of each document including the visual codes on the server, but is able to work with merely a recordation of what code was used to mark each edit, opening, download, and/or other treatment of each document, greatly reducing required storage needed to operate the present system. Notably, this also means that the original version of the document does not need to be edited at the server-side, but is maintained in its original form and the codes are added as the document is newly downloaded, opened, edited, or otherwise treated.

Figure 2:
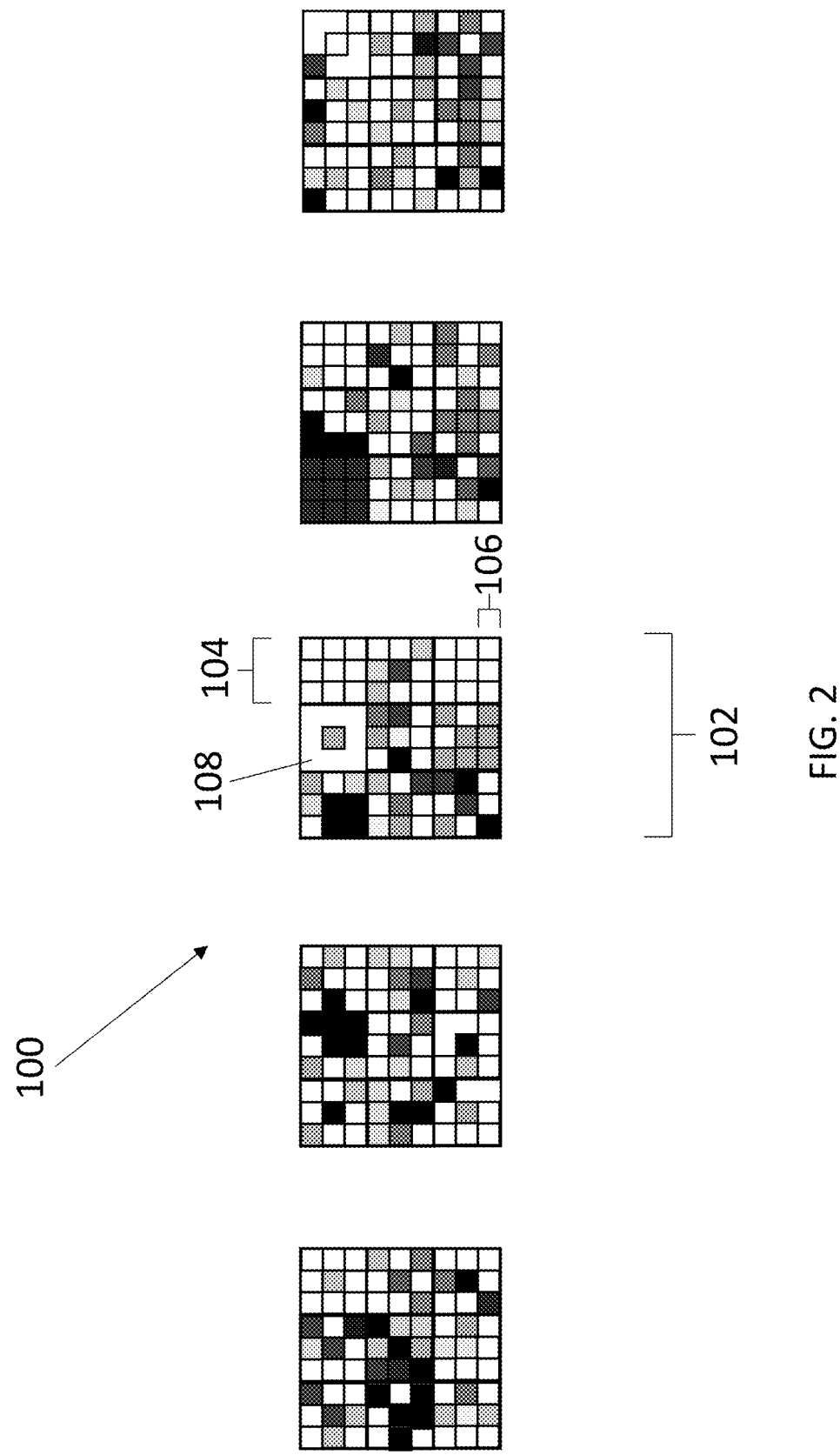
FIG. 2 illustrates a code pattern according to one embodiment of the present invention.

FIG. 2 illustrates a code pattern according to one embodiment of the present invention. In one embodiment, the visual code 100 includes a plurality of polygons 102 each with different shading. In one embodiment, each polygon 102 is shaded in greyscale with a single shade. In one embodiment, as shown in FIG. 2, the plurality of polygons 102 includes five polygons. However, one of ordinary skill in the art will understand that the present invention is not limited to five polygons and a smaller number (e.g., 2, 3, 4,) or a larger number (e.g., 6, 10, 15, 25, 50, 100, etc.) is also able to be used. In one embodiment, as shown in FIG. 2, the plurality of polygons 102 includes a plurality of rectangles (or specifically squares). However, one of ordinary skill in the art will understand that the present invention is not limited to square polygons and any defined two-dimensional shape is able to be used, including, but not limited to, circles, triangles, pentagons, hexagons, octagons, rhombuses, trapezoids, and other shapes. Furthermore, the plurality of polygons 102 is not limited to a single type of polygon. Therefore, a single visual code 100 is able to include, for example, at least one square, at least one circle, and at least one triangle.

In one embodiment, each of the plurality of polygons are subdivided into a second set of polygons 104, where the second set of polygons are each associated with one or more greyscale shades. For example, in one embodiment, as shown in FIG. 2, the plurality of polygons includes a plurality of rectangles, which are each subdivided into nine smaller rectangles. In another embodiment, each of the second set of polygons 104 is further subdivided into a third set of polygons 106. For example, in one embodiment, as shown in FIG. 2, the plurality of polygons includes a plurality of rectangles, which are each subdivided into nine smaller rectangles, and each of the smaller rectangles is further subdivided into nine rectangles. Subdivision into a second set of polygons 104 and/or a third set of polygons 106 allows the visual code 100 to encode a greater amount of information, as the number of possible combinations of greyscale shades increases dramatically. Furthermore, in one embodiment, the second set of polygons 104 and/or the third set of polygons 106 are arranged to form a one-dimensional pattern (i.e., all arranged horizontally or all arranged vertically) or a two-dimensional pattern (i.e., arranged both horizontally and vertically), as shown in FIG. 2. In one embodiment, the two-dimensional pattern includes "missing polygons," which are defined as areas within the first plurality of polygons that are not evenly divided into the second set of polygons, as exemplified by region 108 in FIG. 2. Providing the possibility of missing polygons creates an even greater number of possible configurations of the visual code 100.

The American Standard Code for Information Interchange (ASCII) system of representation includes 128 characters, including both uppercase and lowercase numbers, the numbers 0-9, and a variety of special characters. A typical RGB display is capable of displaying 256 shades of gray, ranging from white to black. For a five polygon system where each polygon has a single color, this provides for over one trillion different permutations. This means that the five polygon system alone is capable of effectively representing a five-character ASCII string (which has only about 35 billion possible combinations, and is even capable of representing a six-character ASCII string if the ASCII is simplified to remove capital letters and some special characters. However, the number of possible representations increases exponentially with the subdivision of the polygons. Subdividing 5 polygons into 9 smaller polygons each provides for eat least $2.3*10^{108}$ different permutations, while each smaller polygon into 9 polygons each increases this number even more past $2*10^{975}$. This allows representation of an ASCII string with length nearly 500 characters long, which is far, far greater than sufficient for any document representation. Therefore, for a more reasonably length string of, for instance, 15 characters, the system allows for representations with higher tolerance and for a large number of "non-coding blocks" that reduce the likelihood of a user being able to determine a key used to decipher the code. Furthermore, one of ordinary skill in the art will understand that the invention is not limited to the use of greyscale shades, but is capable of using any variety of colors. However, because most documents are only printed in black and white, greyscale shading is used in a preferred embodiment of the present invention.

Figure 3:
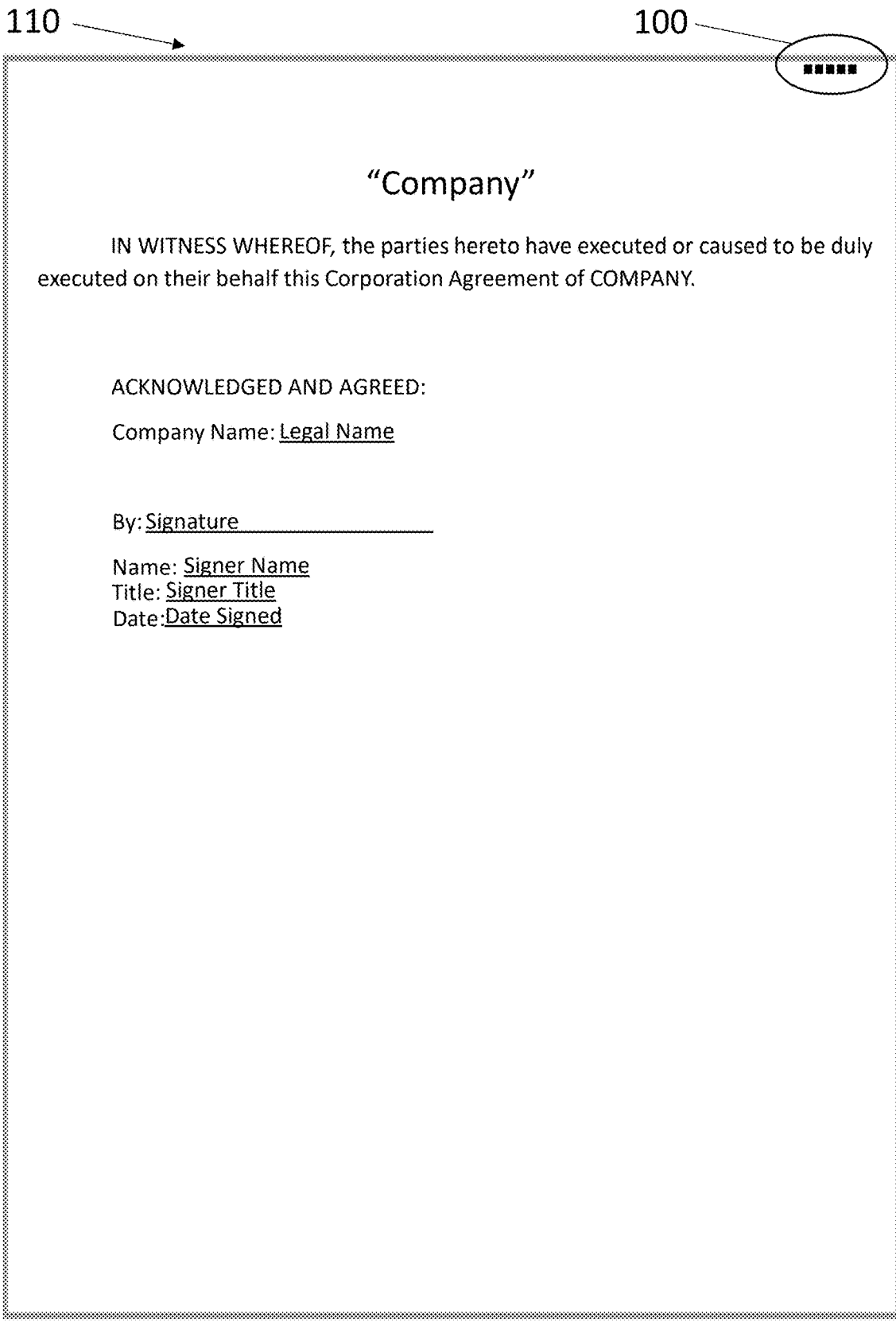
FIG. 3 illustrates a digital document with an applied code pattern according to one embodiment of the present invention.

FIG. 3 illustrates a digital document with an applied code pattern according to one embodiment of the present invention. When a request to view or download a digital document 110 is received, the platform alters the shading of a plurality of pixels of the digital document 110 in order to add the visual code 100 to the digital document 110. In one embodiment, the visual code 100 is always added to the same place on each digital document 110 (e.g., always a fixed horizontal distance from an edge of the digital document 110, always a fixed vertical distance from an edge of the digital document 110, always a fixed horizontal distance from the center of the digital document 110, always a fixed vertical distance from the center of the digital document 110, always beginning at a specific X-Y coordinate on the digital document 110, etc.). In a preferred embodiment, a location is chosen for the visual 100 outside of the margins of the text for most digital documents, so as to prevent interference between the text and the visual code 100. The use of a consistent location on the text is beneficial as it allows someone checking the document to look at a known location, rather than needing to search the document for a potentially very small code to scan. However, in another embodiment, the visual code 100 is not added to the same location on each document, and the system is able to automatically detect the location of the visual code 100 based on the unique density of greyscale variations and the relative spacing used in the code.

In one embodiment, a visual code 100 is added to each page of the document, so as to ensure that the watermark protects against even partial reproductions of the document. In one embodiment, the visual code 100 includes two components: a first component corresponding to the document as a whole, and a second component corresponding to the individual page number. In one embodiment, the first component and the second component are separated by a vertical line. In one embodiment, the visual code 100 is added to the same place on each page within a single document, while, in another embodiment, the placement of the visual code 100 is not consistent.

In another embodiment, the server includes a scanning module operable to automatically scan the digital document 110 to determine "content areas" (i.e., where text, images, or other content is positioned on the digital document 110) and "non-content areas" (i.e., white areas on the document without text or images) of the digital document 110. In one embodiment, the scanning module uses optical character recognition (OCR) as known in the art and as discussed, for example, in such patents as U.S. Pat. Nos. 10,846,523, 10,997,186, and/or 10,936,862, which are incorporated herein by reference in their entireties. The server then automatically selects a position on the document in a non-content area to add the visual code 100. Therefore, the inclusion of the scanning module is beneficial, as it ensures that wherever the visual code 100 is placed doesn't overlap with content, so as to not interfere with the integrity of the code, or with the presentability of the document. In one embodiment, the scanning module includes an artificial intelligence module.

The notably small size of the visual code 100 on the digital document 110 keeps the code subtle, with a low chance of interfering with information on the digital document 110 and helps prevent users from detecting the presence or purpose of the visual code 100. In one embodiment, the visual code 100 has a total length of less than approximately one centimeter. In one embodiment, the visual code 100 has a total length of less than approximately five millimeters. In one embodiment, the visual code 100 has a total height of less than approximately five millimeters. In one embodiment, the visual code 100 has a total height of less than approximately two millimeters.

Figure 4:
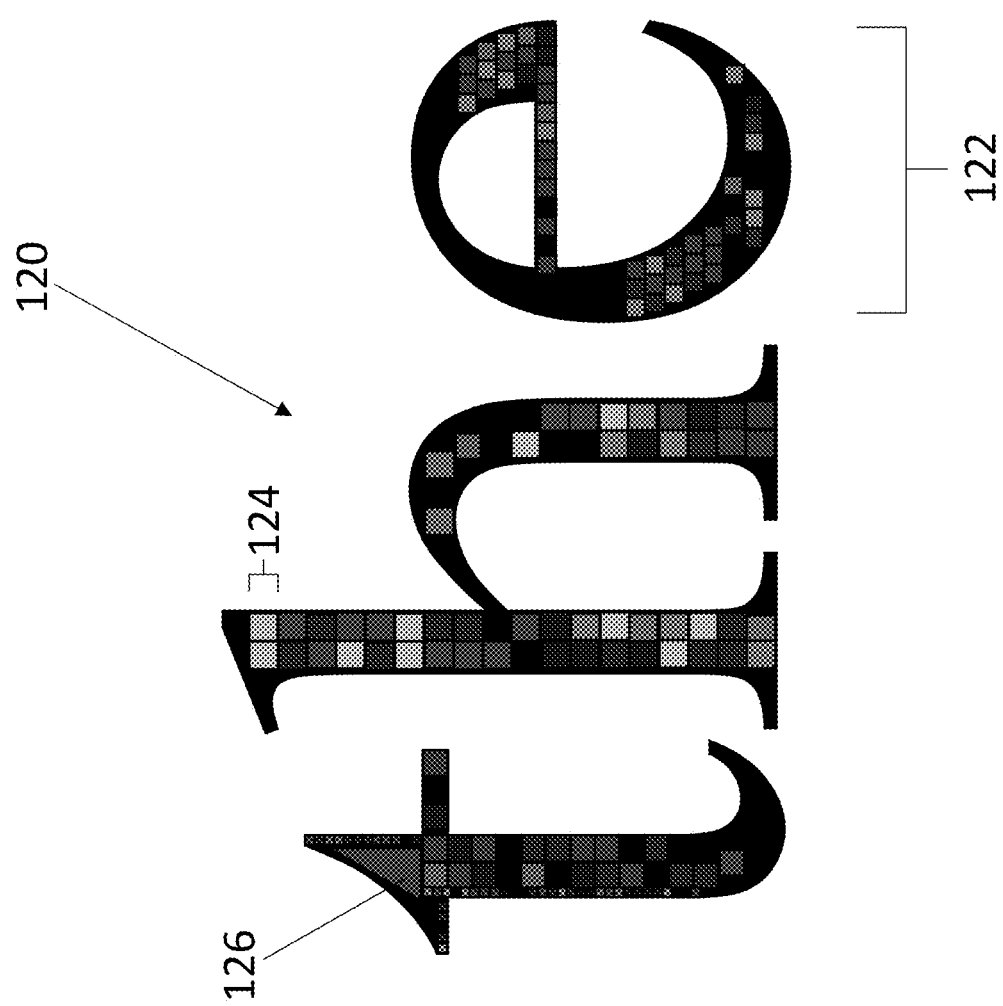
FIG. 4 illustrates a code pattern embedded in letters of a digital document according to one embodiment of the present invention.

FIG. 4 illustrates a code pattern embedded in letters of a digital document according to one embodiment of the present invention. In one embodiment, the visual code 120 is embedded in a letter or a sequence of letters. By way of example and not of limitation, in one embodiment, a scanning module of the server scans each digital document for a common word, such as "the" or "was." Each letter 122 of the first instance of the common word (as measured, for example, from the top left of the digital document to the bottom right of the digital document) is automatically tessellated or partially tessellated with a plurality of polygons 124. In one embodiment, as shown in FIG. 4, each of the plurality of polygons 124 are not the same size, but are adapted in size to fit the shape of the letter 122. In one embodiment, as shown in FIG. 4, not all of the plurality of polygons are the same type of polygon. For example, in one embodiment, the plurality of polygons 124 includes at least one square 124 and at least one triangle 126. Embedding the visual code in a letter or a sequence of letters is useful in hiding the presence of the code from users, as the letter or sequence of letters is likely to look substantially normal when in a normal zoom mode, and is potentially indistinguishable from a fully black letter to the naked eye.

In one embodiment, the server is in network communication with at least one database including a list of predetermined letters and/or a list of predetermined sequences of letters. The scanning module starts by scanning the document for the first entry in the list of predetermined letters and/or the list of predetermined sequences of letters and if the first entry is not present, then the scanning module scans for the second entry in the list and so on. In this way, the scanning module is capable of adapting to different documents that do not contain a single target word. One of ordinary skill in the art will understand that the scanning module is not limited to scanning for letters or sequences of letters and it is also capable of scanning for other shapes or features as well.

Figure 5:
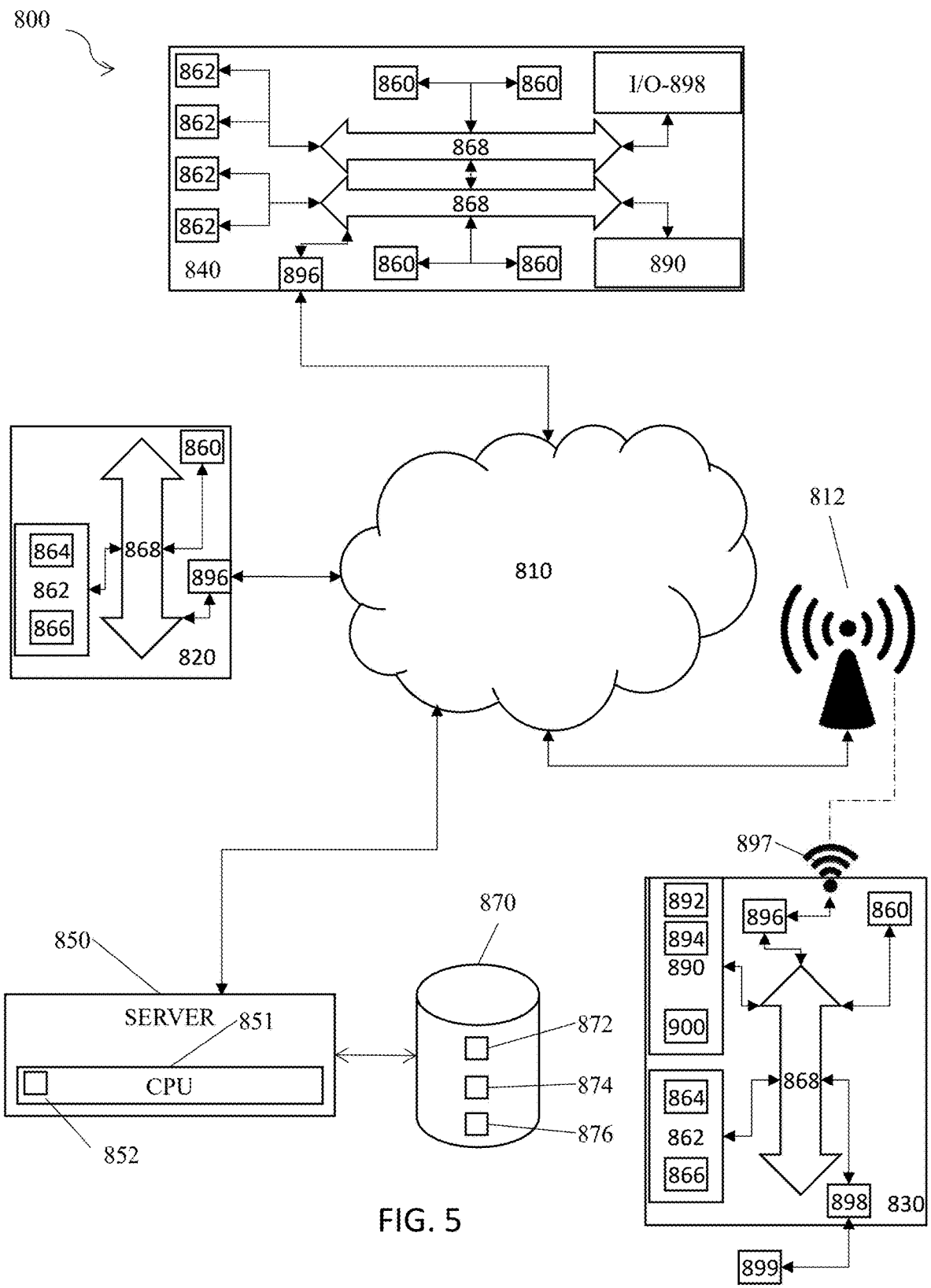
FIG. 5 is a schematic diagram of a system of the present invention.

FIG. 5 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 5, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 5, is operable to include other components that are not explicitly shown in FIG. 5, or is operable to utilize an architecture completely different than that shown in FIG. 5. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Data Stored on a Distributed Ledger

In a preferred embodiment, the platform is operable to store data on a distributed ledger, e.g., a blockchain. Distributed ledger technology refers to an infrastructure of replicated, shared, and synchronized digital data that is decentralized and distributed across a plurality of machines, or nodes. The nodes include but are not limited to a mobile device, a computer, a server, and/or any combination thereof. Data is replicated and synchronized across a network of nodes such that each node has a complete copy of the distributed ledger. The replication and synchronization of data across a distributed set of devices provides increased transparency over traditional data storage systems, as multiple devices have access to the same set of records and/or database. Additionally, the use of distributed ledgers eliminates the need for third party and/or administrative authorities because each of the nodes in the network is operable to receive, validate, and store additional data, thus creating a truly decentralized system. Eliminating the third party and/or administrative authorities saves time and cost. A decentralized database is also more secure than traditional databases, which are stored on a single device and/or server because the decentralized data is replicated and spread out over both physical and digital space to segregated and independent nodes, making it more difficult to attack and/or irreparably tamper with the data. Tampering with the data at one location does not automatically affect the identical data stored at other nodes, thus providing greater data security.

In addition to the decentralized storage of the distributed ledger, which requires a plurality of nodes, the distributed ledger has further advantages in the way that data is received, validated, communicated, and added to the ledger. When new data is added to the distributed ledger, it must be validated by a portion of the nodes (e.g., 51%) involved in maintaining the ledger in a process called consensus. Proof of work, proof of stake, delegated proof of stake, proof of space, proof of capacity, proof of activity, proof of elapsed time, and/or proof of authority consensus are all compatible with the present invention, as are other forms of consensus known in the art. In one embodiment, the present invention uses fault-tolerant consensus systems. Each node in the system is operable to participate in consensus, e.g., by performing at least one calculation, performing at least one function, allocating compute resources, allocating at least one token, and/or storing data. It is necessary for a portion of the nodes in the system (e.g., 51% of the nodes) to participate in consensus in order for new data to be added to the distributed ledger. Advantageously, requiring that the portion of the nodes participate in consensus while all nodes are operable to participate in consensus means that authority to modify the ledger is not allocated to one node or even a group of nodes but rather is equally distributed across all of the nodes in the system. In one embodiment, a node that participates in consensus is rewarded, e.g., with a digital token, in a process called mining.

The blockchain is a commonly used implementation of a distributed ledger and was described in Satoshi Nakamoto's whitepaper *Bitcoin: A Peer-to-Peer Electronic Cash System*, which was published in October 2008 and which is incorporated herein by reference in its entirety. In the blockchain, additional data is added to the ledger in the form of a block. Each block is linked to its preceding block with a cryptographic hash, which is a one-way mapping function of the data in the preceding block that cannot practically be computed in reverse. In one embodiment, a timestamp is also included in the hash. The computation of the cryptographic hash based on data in a preceding block is a computationally intensive task that could not practically be conducted as a mental process. The use of cryptographic hashes means that each block is sequentially related to the block before it and the block after it, making the chain as a whole immutable. Data in a block in a preferred embodiment cannot be retroactively altered after it is added to the chain because doing so changes the associated hash, which affects all subsequent blocks in the chain and which breaks the mapping of the preceding block. The blockchain is an improvement on existing methods of data storage because it connects blocks of data in an immutable fashion. Additionally, the blockchain is then replicated and synchronized across all nodes in the system, ensuring a distributed ledger. Any attempted changes to the blockchain are propagated across a decentralized network, which increases the responsiveness of the system to detect and eliminate fraudulent behavior compared to non-distributed data storage systems. The blockchain and the distributed ledger solve problems inherent to computer networking technology by providing a secure and decentralized way of storing data that is immutable and has high fault tolerance. The distributed ledger stores digital data and is thus inextricably tied to computer technology. Additional information about the blockchain is included in *The Business of Blockchain* by William Mougavar published in April 2016, which is incorporated herein by reference in its entirety.

In one embodiment, the data added to the distributed ledger of the present invention include digital signatures. A digital signature links a piece of data (e.g., a block) to a digital identity (e.g., a user account). In one embodiment, the digital signature is created using a cryptographic hash and at least one private key for a user. The content of the piece of data is used to produce a cryptographic hash. The cryptographic hash and the at least one private key are used to create the digital signature using a signature algorithm. The digital signature is only operable to be created using a private key. However, the digital signature is operable to be decoded and/or verified using a public key also corresponding to the user. The separation of public keys and private keys means that external parties can verify a digital signature of a user using a public key but cannot replicate the digital signature since they do not have a private key. Digital signatures are not merely electronic analogs of traditional physical signatures. Physical signatures are easily accessible and easily replicable by hand. In addition, there is no standard algorithm to verify a physical signature except comparing a first signature with a second signature from the same person via visual inspection, which is not always possible. In one embodiment, the digital signatures are created using the data that is being linked to the digital identity whereas physical signatures are only related to the identity of the signer and are agnostic of what is being signed. Furthermore, digital signatures are transformed into a cryptographic hash using a private key, which is a proof of identity of which there is no physical or pre-electronic analog. Digital signatures, and cryptographic hashes in general, are of sufficient data size and complexity to not be understood by human mental work, let alone verified through the use of keys and corresponding algorithms by human mental work. Therefore, creating, decoding, and/or verifying digital signatures with the human mind is highly impractical.

Public, private, consortium, and hybrid blockchains are compatible with the present invention. In one embodiment, the blockchain system used by the present invention includes sidechains wherein the sidechains run parallel to a primary chain. Implementations of distributed ledger and/or blockchain technology including, but not limited to, BITCOIN, ETHEREUM, HASHGRAPH, BINANCE, FLOW, TRON, TEZOS, COSMOS, and/or RIPPLE are compatible with the present invention. In one embodiment, the platform includes at least one acyclic graph ledger (e.g., at least one tangle and/or at least one hashgraph). In one embodiment, the platform includes at least one quantum computing ledger.

In one embodiment, the present invention further includes the use of at least one smart contract, wherein a smart contract includes a set of automatically executable steps and/or instructions that are dependent on agreed-upon terms. The smart contract includes information including, but not limited to, at least one contracting party, at least one contract address, contract data, and/or at least one contract term. In one embodiment, the at least one smart contract is deployed on a blockchain such that the at least one smart contract is also stored on a distributed node infrastructure. In one embodiment, the terms of the at least one smart contract are dependent on changes to the blockchain. For example, a provision of the at least one smart contract executes when a new block is added to the blockchain that meets the terms of the at least one smart contract. The smart contract is preferably executed automatically when the new block is added to the blockchain. In one embodiment, a first smart contract is operable to invoke a second smart contract when executed. A smart contract is operable to capture and store state information about the current state of the blockchain and/or the distributed ledger at any point in time. Advantageously, a smart contract is more transparent than traditional coded contracts because it is stored on a distributed ledger. Additionally, all executions of the smart contract are immutably stored and accessible on the distributed ledger, which is an improvement over non-distributed, stateless coded contracts. In one embodiment, the state information is also stored on a distributed ledger.

Cryptocurrency Transactions

Distributed ledger technology further enables the use of cryptocurrencies. A cryptocurrency is a digital asset wherein ownership records and transaction records of a unit of cryptocurrency (typically a token) are stored in a digital ledger using cryptography. Use of centralized cryptocurrencies and decentralized cryptocurrencies are both compatible with the present invention. Centralized cryptocurrencies are minted prior to issuance and/or are issued by a single body. Records of a decentralized cryptocurrency are stored on a distributed ledger (e.g., a blockchain), and any node participating in the distributed ledger is operable to mint the decentralized cryptocurrency. The distributed ledger thus serves as a public record of financial transactions. Cryptocurrencies are typically fungible in that each token of a given cryptocurrency is interchangeable. The present invention is operable to facilitate transactions of at least one cryptocurrency, including, but not limited to, BITCOIN, LITECOIN, RIPPLE, NXT, DASH, STELLAR, BINANCE COIN, and/or ETHEREUM. In one embodiment, the present invention is operable to facilitate transactions of stablecoins, NEO Enhancement Protocol (NEP) tokens, and/or BINANCE Chain Evolution Proposal (BEP) tokens. In one embodiment, the present invention is operable to support tokens created using the ETHEREUM Request for Comment (ERC) standards as described by the Ethereum Improvement Proposals (EIP). For example, the present invention is operable to support ERC-20-compatible tokens, which are created using the *EIP-20: ERC-20 Token Standard*, published by Vogelsteller, et al., on Nov. 19, 2015, which is incorporated herein by reference in its entirety.

A cryptocurrency wallet stores keys for cryptocurrency transactions. As cryptocurrency is a virtual currency, the ability to access and transfer cryptocurrency must be protected through physical and/or virtual means such that such actions are only operable to be performed by the rightful owner and/or parties with permission. In one embodiment, a cryptocurrency wallet stores a private key and a public key. In another embodiment, the cryptocurrency wallet is operable to create the private key and/or the public key, encrypt data, and/or sign data (e.g., with a digital signature). In one embodiment, the private key is generated via a first cryptographic algorithm wherein the input to the first cryptographic algorithm is random. Alternatively, the input to the first cryptographic algorithm is non-random. In one embodiment, the public key is generated from the private key using a second cryptographic algorithm. In one embodiment, the first cryptographic algorithm and the second cryptographic algorithm are the same. The private key is only accessible to the owner of the cryptocurrency wallet, while the public key is accessible to the owner of the cryptocurrency wallet as well as a receiving party receiving cryptocurrency from the owner of the cryptocurrency wallet. Deterministic and non-deterministic cryptocurrency wallets are compatible with the present invention.

As a non-limiting example, a cryptocurrency transaction between a first party and a second party involves the first party using a private key to sign a transaction wherein the transaction includes data on a first cryptocurrency wallet belonging to the first party, the amount of the transaction, and a second cryptocurrency wallet belonging to the second party. In one embodiment, the second cryptocurrency wallet is identified by a public key. The transaction is then populated to a distributed network wherein a proportion (e.g., 51%) of the nodes of the distributed network verify the transaction. Verifying the transaction includes verifying that the private key corresponds to the first cryptocurrency wallet and that the amount of the transaction is available in the first cryptocurrency wallet. The nodes then record the transaction on the distributed ledger, e.g., by adding a block to a blockchain. Fulfilling the cryptocurrency transaction is a computationally intensive process due to key cryptography and the consensus necessary for adding data to the distributed ledger that could not practically be performed in the human mind. In one embodiment, a node is operable to verify a block of transactions rather than a single transaction.

Desktop wallets, mobile wallets, hardware wallets, and web wallets are compatible with the present invention. A software wallet (e.g., a desktop wallet, a mobile wallet, a web wallet) stores private and/or public keys in software. A hardware wallet stores and isolates private and/or public keys in a physical unit, e.g., a universal serial bus (USB) flash drive. The hardware wallet is not connected to the internet or any form of wireless communication, thus the data stored on the hardware wallet is not accessible unless the hardware wallet is connected to an external device with network connection, e.g., a computer. In one embodiment, the data on the hardware wallet is not operable to be transferred out of the hardware wallet. In one embodiment, the hardware wallet includes further data security measures, e.g., a password requirement and/or a biometric identifier requirement. In one embodiment, the present invention is operable to integrate a third-party cryptocurrency wallet. Alternatively, the present invention is operable to integrate a payments platform that is compatible with cryptocurrency, including, but not limited to, VENMO, PAYPAL, COINBASE, and/or payments platforms associated with financial institutions.

Tokenization

In one embodiment, the platform is operable to tokenize assets. A token is a piece of data that is stored on the distributed digital ledger and that can be used to represent a physical and/or a digital asset, e.g., in a transaction, in an inventory. The token is not the asset itself; however, possession and transfer of the token are stored on the distributed digital ledger, thus creating an immutable record of ownership. In one embodiment, the token includes cryptographic hashes of asset data, wherein the asset data is related to the asset. In one embodiment, the asset data is a chain of data blocks. For example, the asset is a work of digital art, and the asset data includes data about the work such as information about an artist, a subject matter, a file type, color data, etc. The corresponding token includes a cryptographic hash of the asset data, which describes the work. Alternative mappings of the asset data to the token are also compatible with the present invention. In one embodiment, the token is a non-fungible token (NFT). A first non-fungible token is not directly interchangeable with a second non-fungible token; rather, the value of the first token and the second token are determined in terms of a fungible unit (e.g., a currency). In one embodiment, the platform is operable to support ETHEREUM standards for tokenization, including, but not limited to, *EIP-721: ERC-721 Non-Fungible Token Standard* by Entriken, et al., which was published Jan. 24, 2018 and which is incorporated herein by reference in its entirety. In one embodiment, the platform is operable to create fractional NFTs (f-NFTs), wherein each f-NFT represents a portion of the asset. Ownership of an f-NFT corresponds to partial ownership of the asset.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for digitally encoding a digital document, comprising:
   at least one server, including a processor and a memory, in network communication with at least one user device;
   wherein the at least one server is operable to receive a document request message from the at least one user device, wherein the document request message includes a request to view or download one or more digital documents;
   wherein the at least one server is operable to generate a code uniquely corresponding to a unique value for each of the one or more digital documents and/or for particular versions of the one or more digital documents;
   wherein the code is embedded into the one or more digital documents; and
   wherein the code includes a plurality of polygons embedded within one or more letters in the one or more digital documents.

2. The system of claim 1, wherein each of the plurality of polygons are subdivided into a second plurality of polygons having one or more greyscale shadings.

3. The system of claim 1, wherein at least one of the plurality of polygons does not encode or correspond to information in the unique value.

4. The system of claim 1, further comprising a scanning device operable to scan the one or more digital documents and generate the unique value corresponding to each of the one or more digital documents based on the code.

5. The system of claim 4, wherein the unique value is generated based on a relative difference in greyscale shading between components of the code.

6. The system of claim 1, wherein, upon receiving a second document request message for the same one or more digital documents, the at least one server generates a new version of the one or more digital documents without the previous code, and embeds a new code in each of the one or more digital documents.

7. A system of digitally encoding a digital document, comprising:
   at least one server, including a processor and a memory, in network communication with at least one user device;
   wherein the at least one server is operable to receive a document request message from the at least one user device, wherein the document request message includes a request to view or download one or more digital documents;
   wherein, upon receiving the document request message, the at least one server automatically generates a code corresponding to a unique value, wherein the code includes wherein the code includes a plurality of polygons embedded within one or more letters in the one or more digital documents; and
   wherein the code is embedded into the one or more digital documents.

8. The system of claim 7, wherein the at least one server is in network communication with at least one database including a list of preselected letters and/or preselected sequences of letters, wherein the at least one server first scans the one or more digital documents for instances of a first entry in the list of preselected letters and/or preselected sequences of letters, and wherein, if the first entry is not present, then the at least one server scans the one or more digital documents for instances of other entries in the list of preselected letters and/or preselected sequences of letters.

9. The system of claim 7, wherein the at least one server scans the one or more digital documents for one or more additional preselected letters and/or one or more additional preselected sequences of letters, wherein the at least one server automatically embeds a second plurality of shaded polygons into the one or more additional preselected letters and/or the one or more additional preselected sequences of letters, and wherein the second plurality of shaded polygons does not correspond to the unique value.

10. The system of claim 7, wherein the plurality of polygons include a plurality of rectangles.

11. The system of claim 10, wherein each of the plurality of rectangles are subdivided into a second plurality of rectangles having one or more greyscale shadings.

12. The system of claim 7, further comprising a scanning device operable to scan the one or more digital documents and generate the unique value corresponding to each of the one or more digital documents based on the pattern of the plurality of polygons and/or the greyscale shading of each of the plurality of polygons in the code.

13. The system of claim 12, wherein the unique value is generated based on a relative difference in greyscale shading between each of the plurality of polygons in the code.

14. The system of claim 7, wherein, upon receiving a second document request message for the same one or more digital documents, the at least one server generates a new version of the one or more digital documents without the previous code, and embeds a new code in each of the one or more digital documents.

15. A method for digitally encoding a digital document, comprising:
   providing at least one server, including a processor and a memory, in network communication with at least one user device;
   the at least one server receiving a document request message from the at least one user device, wherein the document request message includes a request to view or download one or more digital documents;
   upon receiving the document request message, the at least one server automatically generating a code corresponding to a unique value;
   the code including a plurality of polygons embedded within one or more letters in the one or more digital documents; and
   embedding the code in the one or more digital documents.

16. The method of claim 15, further comprising a scanning device scanning the one or more digital documents and generating the unique value corresponding to each of the one or more digital documents based on a pattern of a plurality of polygons and/or a greyscale shading of each of a plurality of polygons in the code.

17. The method of claim 16, further comprising the scanning device generating the unique value based on a relative difference in greyscale shading between each of a plurality of polygons in the code.

18. The method of claim 15, wherein the code includes a plurality of rectangles, and wherein each of the plurality of rectangles are subdivided into a second plurality of rectangles having one or more greyscale shadings.

19. The method of claim 15, wherein at least one of the plurality of polygons does not encode or correspond to information in the unique value.

20. The method of claim 15, further comprising, upon receiving a second document request message for the same one or more digital documents, the at least one server generating a new version of the one or more digital documents without the previous code, and embedding a new code in each of the one or more digital documents.

* * * * *